United States Patent [19]
Miyamoto et al.

[11] Patent Number: 5,805,972
[45] Date of Patent: Sep. 8, 1998

[54] METHOD AND APPARATUS FOR SEPARATING ISOTOPES

[75] Inventors: Goro Miyamoto, Kanagawa-ken; Yoshio Murakami; Seiji Hiroki, both of Ibaraki; Kenji Katsuki, Kanagawa-ken, all of Japan

[73] Assignees: Japan Atomic Energy Research Institute; Kabushiki Kaisha Toshiba, both of Kanagawa-ken, Japan

[21] Appl. No.: 808,642

[22] Filed: Feb. 28, 1997

Related U.S. Application Data

[62] Division of Ser. No. 607,467, Feb. 27, 1996, Pat. No. 5,653,854.

[30] Foreign Application Priority Data

Feb. 28, 1995 [JP] Japan ................................ 7-040607

[51] Int. Cl.⁶ .................................................. B01J 19/12
[52] U.S. Cl. ............................................... 422/186.03
[58] Field of Search ........................................ 422/186.03

[56] References Cited

U.S. PATENT DOCUMENTS 3,437,862  4/1969  Salisbury ........................... 204/116
4,786,478  11/1988  Ahmed et al. .................. 422/186.03

FOREIGN PATENT DOCUMENTS 178320  8/1991  Japan.
313322  11/1992  Japan.

*Primary Examiner*—Kathryn L. Gorgos
*Assistant Examiner*—Kishor Mayekar
*Attorney, Agent, or Firm*—Banner & Witcoff, Ltd.

[57] ABSTRACT

The improved isotope separator comprises a vacuum vessel, a plasma generator located substantially in the center of the vacuum vessel, an electrode bounded by a hyperboloid of one sheet and a pair of electrodes bounded by a hyperboloid of two sheets, said electrodes being located within the vacuum vessel in such a way as to surround the plasma generator, a power source for supplying said electrodes with a fixed voltage and a pulsating voltage, and magnetic field generating means located outside the vacuum vessel. The apparatus is implemented by a method for isotope separation that achieves high separation factor per stage (process), that enables the process throughput to be increased with ease and which yet is applicable to the isotopic separation of many elements.

1 Claim, 4 Drawing Sheets

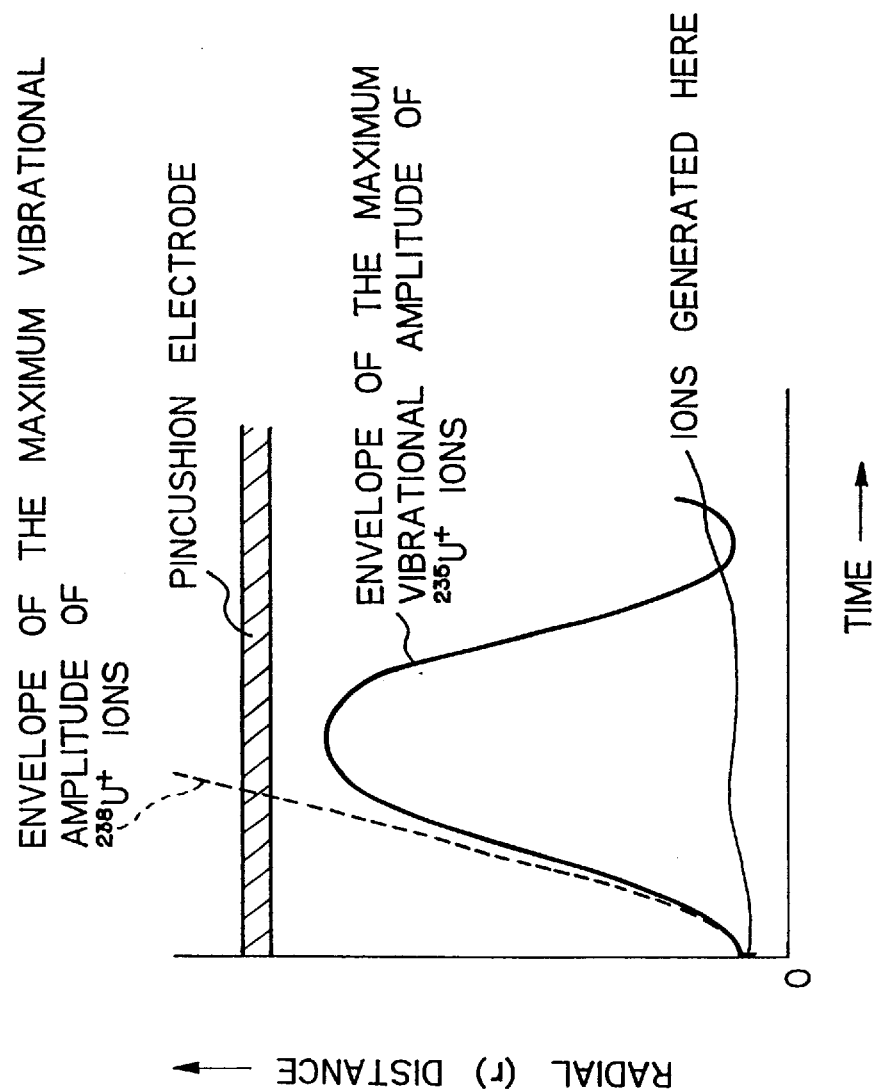

METHOD AND APPARATUS FOR SEPARATING ISOTOPES

This application is a division of application Ser. No. 08/607,467, filed Feb. 27, 1996, now U.S. Pat. No. 5,653,854.

BACKGROUND OF THE INVENTION

This invention relates to the separation of isotopes such as those of uranium having different masses. In particular, the invention relates to a method by which an ionized substance can be separated into respective isotopes in accordance with the mass difference in the combination of a magnetic field and an electric field composed of a pulsating voltage superposed on a fixed voltage, as well as an apparatus for implementing the method.

The isotope separation technology has so far been largely developed to meet the need for enriching uranium-235 as a nuclear reactor fuel. Recently, it has been proposed that only the isotopes of metal elements having low activation characteristics that are relatively preferred for structural materials of nuclear fusion reactors, large-scale accelerators, etc. should be separated for use. This is because the selective separation and use of the required isotopes facilitates the maintenance of fusion reactors and large-scale accelerators and achieves considerable reduction in radioactive wastes to be disposed of. To obtain these benefits, it is required to develop a technique that is capable of separating the isotopes of metal elements at low cost.

Methods that have heretofore been used to separate uranium's isotopes and other atoms or molecules having small mass differences include gaseous diffusion, centrifugal separation, chemical approach (adsorption), mass separation in an electromagnetic field, and selective ionization with laser beams.

The gaseous-diffusion, centrifugal separation and chemical process share the common problem of an extremely low separation factor per stage (process), requiring a number of stages to be implemented in practical applications.

The mass-separation process using an electromagnetic field achieves high separation factor but, on the other hand, due to its operating principle which is based on single-particle loci in high vacuum, the throughput of the process is extremely small. The process also involves instrumental problems as exemplified by the need to limit the initial velocity and direction of ions to certain ranges for attaining the necessary resolution or to provide beam limiting slits.

The selective ionization method with laser beams, as it is applied to uranium separation, comprises illuminating a uranium atomic beam with dye laser light to achieve selective excitation of uranium-235 while, at the same time, other laser light is applied to further ionize the uranium-235. This method has met with success in uranium separation; however, with the scarcity of data accumulated for the isotopic separation of other elements; the method has no general applicability.

SUMMARY OF THE INVENTION

The present invention has been accomplished under these circumstances and has as an object providing a method for isotope separation that achieves high separation factor per stage (process), that enables the process throughput to be increased with ease and which yet is applicable to the isotopic separation of many elements.

Another object of the invention is to provide an apparatus suitable for implementing the method.

According to the first aspect of the invention, there is provided a method for separating a substance of interest into isotopes of different masses in an electromagnetic field, characterized in that the substance in an ionized form is subjected to both a magnetic field parallel to the Z axis and an alternating electric field U defined by the following equation (1) which is created by a fixed voltage and a pulsating voltage that are applied to an electrode bounded by a hyperboloid of one sheet (in a pincushion form) and a pair of electrodes bounded by a hyperboloid of two sheets (in the form of the combination of an inverted pileus and a non-inverted pileus), such that the ions lighter than a specified critical mass $M_c$ are transported in the axial (Z) direction as distinguished from the heavier ions which are transported in the radial (r) direction:

$$U = \tfrac{1}{2} \cdot k_0 (1 - A \cos 2\theta))(-r^2 + 2Z^2) \tag{1}$$

U : alternating electric field
$k_0$ : constant
A : constant
θ: time function
: radial distance
Z : axial distance In short, the isotope separation method of the invention, which uses an electromagnetic field to separate a substance of interest into isotopes having different masses, is based on the novel finding that in the space of a special electromagnetic field that is expressed by cylindrical coordinates, ions of like species generated in a wide region of that space can selectively be transported in the axial or radial direction irrespective of the initial velocity of the ions or the direction in which they start to travel.

This method allows the ions lighter than a specified critical mass $M_c$ to be transported in the axial direction as distinguished from the heavier ions that are transported in the radial direction.

The method can be implemented with an apparatus for isotope separation that comprises a vacuum vessel, a plasma generator located substantially in the center of said vacuum vessel, an electrode bounded by a hyperboloid of one sheet and a pair of electrodes bounded by a hyperboloid of two sheets, said electrodes being located within said vacuum vessel such a way as to surround said plasma generator, a power source for supplying said electrodes with a fixed voltage and a pulsating voltage, and magnetic field generating means located outside said vacuum vessel.

BRIEF DESCRIPTION OF THE DRAWINGS

FIG. 4 is a graph showing the movement of ions relative to the pincushion electrode in the embodiment.

DETAILED DESCRIPTION OF THE INVENTION

Figure 1:
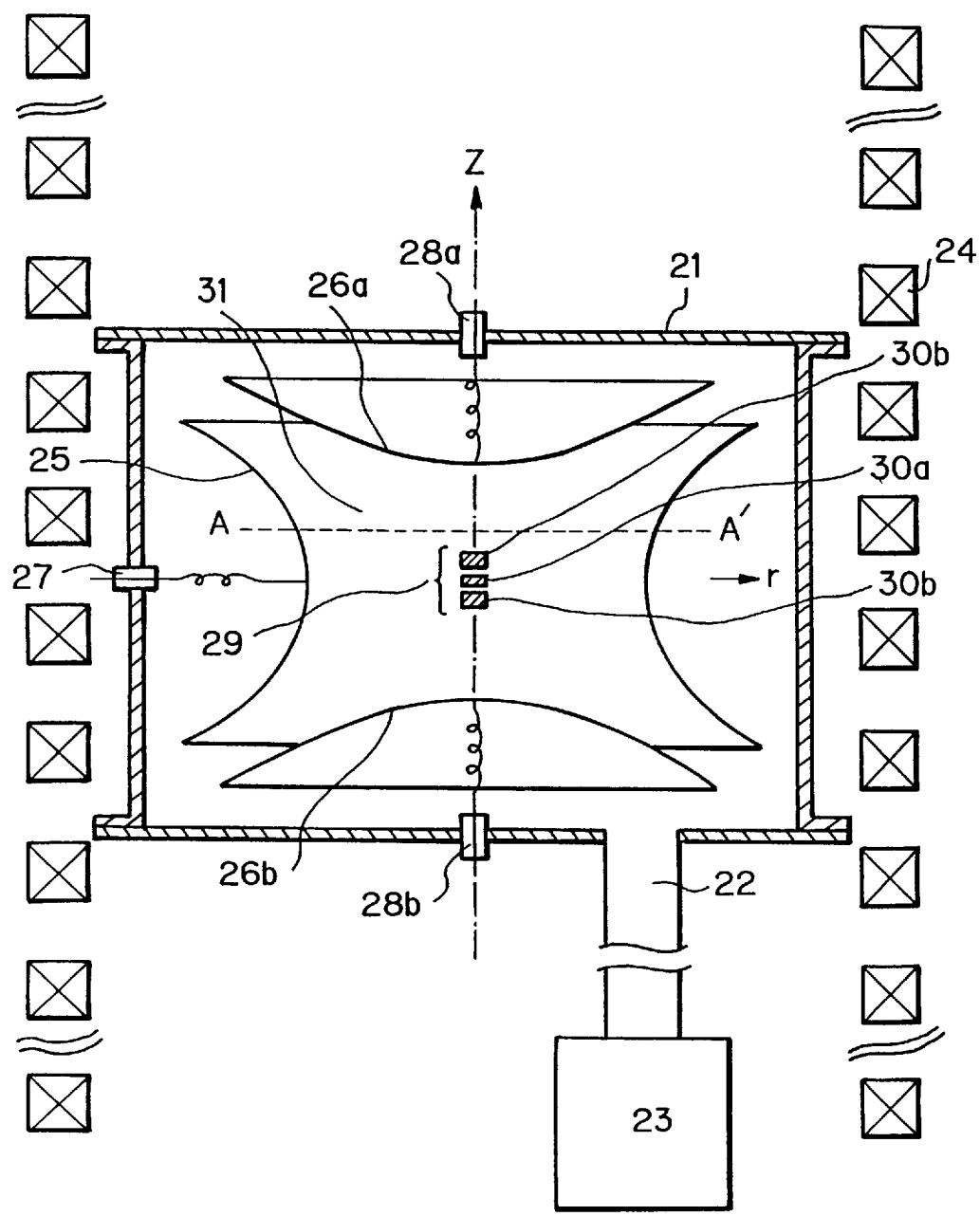
FIG. 1 is a longitudinal section of the general composition of an isotope separator according to an embodiment of the invention.

The vacuum vessel to be used in the invention is in no way limited but, typically, it has a generally cylindrical form which conforms to the space of an applied electromagnetic field and for the purpose of stable ion generation, the vessel is advantageously adapted to be capable of creating a high-vacuum atmosphere by being coupled to a pump-down apparatus via an exhaust port. The construction material of the vacuum vessel is determined in consideration of various factors including the mechanical strength and workability; metals such as stainless steel and aluminum alloys are advantageous.

The plasma generator to be used in the invention functions as a plasma source and is located within the vacuum vessel. As in the case of the vacuum vessel, the plasma generator is not limited to any particular type but, advantageously, it comprises a center arc discharge electrodes held between two arc discharge electrodes, all electrodes being formed of the substance to be separated into isotopes.

The electrode bounded by a hyperboloid of one sheet and which is used in the isotope separator of the invention is typically composed of an electrode in a pincushion form. This electrode combines with a pair of electrodes bounded by a hyperboloid of two sheets such as to form an alternating electric field defined by the equation (1).

The electrode bound by a hyperboloid of one sheet is intended to trap heavy ions by causing them to be condensed on the electrode surface. To this end, it is advantageous that the side of the principal electrode facing the isotope separating space has a number of fins detachably embedded in positions generally parallel to the Z axis. The use of an electrode having this structure is favorable for the purposes of the invention in that the neutral particles coming straight from the plasma generator and the ions rotating about the Z axis can be deposited in different areas of the electrode and, hence, can be recovered in a simple manner.

The electrode bounded by a hyperboloid of one sheet is located within the vacuum vessel in such a way as to surround the plasma generator. To achieve an improved efficiency in the separation and trapping of heavy ions, this electrode is advantageously located in a radial position generally greater than the maximum ion amplitude. Specifically, the radial position of the electrode is preferably within the range from 0.8 to 5.0 times, more preferably from 1.0 to 1.5 times, the maximum ion amplitude. If the radial position of the electrode is less than 0.8 times or more than 5.0 times the maximum ion amplitude, the efficiency in the separation and trapping of heavy ions fails significantly or the apparatus becomes unduly bulky. If the radial position of the electrode bounded by a hyperboloid of one sheet is within the range from 1.0 to 1.5 times the maximum ions amplitude, better efficiency is assured for the separation and trapping of heavy ions and the apparatus has a reasonable size.

The pair of electrodes bounded by a hyperboloid of two sheets and which are used in the isotope separator of the invention are intended to trap light ions by causing them to be condensed on the electrode surfaces. They consist typically of the combination of an inverted and a non-inverted pileus and combine with the electrode bounded by a hyperboloid of one sheet such as to form an alternating electric field defined by the equation (1).

As in the case of the electrode bound by a hyperboloid of one sheet, it is advantageous that the side of each principal electrode facing the isotope separating space has a number of fins detachably embedded in positions generally parallel to the radial direction. The electrodes suffice to be located in such a way as to form an alternating electric current; specifically, it is advantageous that the electrodes are located within the vacuum vessel in such a way as to hold the plasma generator therebetween.

In consideration of separation and trapping efficiency, the electrodes are advantageously located in vertical positions that are generally greater than the maximum ion amplitude in the axial (Z) direction. Specifically, the vertical positions of the electrodes are preferably within the range from 0.8 to 5.0 times, more preferably from 1.0 to 1.5 times, the maximum ion amplitude. If the vertical positions of the electrodes are less than 0.8 times or more than 5.0 times the maximum ion amplitude, the efficiency in the separation and trapping of light ions fails significantly or the apparatus becomes unduly bulky. If the vertical positions of the electrodes bounded by a hyperboloid of two sheets are within the range from 1.0 to 1.5 times the maximum ion amplitude, better efficiency is provided for the separation and trapping of light ions and the apparatus has a reasonable size.

The magnetic field generating means for use in the isotope separator of the invention also is not limited in any particular way and customary coils may be employed. The positioning of the magnetic field generating means also is not limited in any particular way but considering the efficiency of ion trapping, it is advantageously located outside the vacuum vessel.

It should be noted that various modifications of the invention can be implemented without departing from its scope and spirit.

It should also be noted that the substance to be separated into isotopes is in no way limited to uranium and metal ions, provided that they are condensable or can be trapped by adsorption on collecting plates.

The following examples are provided for the purpose of further illustrating the invention but are in no way to be taken as limiting.

EXAMPLE 1

FIG. 1 is a longitudinal section of the general composition of the apparatus for isotope separation according to an embodiment of the invention. As shown, a cylindrical vacuum vessel 21 has an exhaust port 22 through which high vacuum is drawn by operating a pump-down apparatus 23. The vacuum vessel 21 is surrounded by coils 24 that form a magnetic field in the axial direction of the cylinder which is the geometry assumed by the vessel 21. Located within the vacuum vessel 21 are an electrode 25 bounded by a quadric surface in a pincushion form that is coaxial with the center of the vessel, as well as an upper electrode 26a bounded by a quadric surface in an inverted pileus form and a lower electrode 26b also bounded by a quadric surface but in a non-inverted pileus form. The electrodes 26a and 26b are also coaxial with the center of the vacuum vessel 21. The electrode 25 is supplied with the necessary voltage from a power source (not shown) via a current lead-in terminal 27 whereas the electrodes 26a and 26b are supplied with the necessary voltage via respective current lead-in terminals 28a and 28b.

A plasma generator 29 in a cylindrical form of a specified diameter is inserted in and coaxial with the center of the vacuum vessel 21. In the case shown in FIG. 1, the plasma generator 29 comprises a center arc discharge electrode 30a held between two arc discharge electrodes 30b, each electrode being composed of the substance to be separated. Needless to say, various other modifications may be conceived for the plasma generator. The electrodes that constitute the plasma generator are supplied with a current through electric wires (not shown) provided along equipotential surfaces that are formed in the isotope separating space 31 within the vacuum vessel 21.

The electrode 25 having a quadric surface in a pincushion form provides a hyperboloid of one sheet whereas the electrodes 26a and 26b having a pair of quadric surfaces consisting of an inverted and a non-inverted pileus provide a hyperboloid of two sheets. These electrodes are so configured that when the center of the apparatus is taken as the origin, with the axial and radial directions being designated the Z and r directions, respectively, a static electric field U' expressed by the following equation (2) can be created within the isotope separating space 31

$$U'=\tfrac{1}{2} \cdot k' (-r'^2 + 2Z'^2) \qquad (2)$$

U': static electric field
k': constant
r': radial distance
Z': axial distance

A discussion will now be made of the case where uranium or other substance are isotopically separated or enriched by the system configuration shown in FIG. 1. The process starts with operating the pump-down apparatus 23 to create high vacuum in the interior of the vacuum vessel 21. Subsequently, the coils 24 are energized to create a specified magnetic field in the axial direction while, at the same time, electrodes 25, 26a and 26b are each supplied with a specified voltage.

The supplied voltage causes an alternating electric field with small pulsations to be created within the isotope separating space 31 according to the equation (1). With the space of the electromagnetic field being thusly placed in the proper condition, the plasma generator 29 is actuated. In Example 1 under consideration, the arc discharge electrodes 30a and 30b are supplied with a sufficient voltage to cause a sustained discharge. The geometries of the discharge electrodes and the voltage to be applied thereto are determined in such a way as to assure that the space of the electromagnetic field will now be greatly disturbed by the insertion of those electrodes.

Plasma generator 29 produces monovalent atomic (molecular) ions, electrons, neutral atoms (molecules), etc. from the substance to be separated into isotopes. Ions and neutral particles, coming out of the plasma generator 29, will flow into the isotope separating space 31 at various initial velocities in different directions. If the substance to be separated is natural uranium, $^{235}U^+$, $^{238}U^+$, $^{235}U^0$, $^{238}U^0$ and other isotopes will be produced and flow into the isotope separating space 31.

The light ions of $^{235}U^+$ flowing into the isotope separating space 31 will rotate around the Z axis at high velocity. In the radial (r) direction, these light ions vibrate at varying amplitudes in the space between the plasma generator 29 and the pincushion electrode 25 but in the axial (Z) direction, the vibration of those ions will diverge with the maximum amplitude increasing with time (the progress of rotation). Hence, the light ions of $^{235}U^+$ will impinge on the electrodes 26 consisting of the combination of an inverted and a non-inverted pileus, on which they are condensed.

In the axial (Z) direction, the heavy ions of $^{238}U^+$ cyclically vibrate at varying amplitudes in the space between the electrodes 26a and 26b but in the radial (r) direction, the vibration of those ions will diverge with the maximum amplitude increasing with time (the progress of rotation). Hence, the heavy ions of $^{238}U^+$ will impinge on the pincushion electrode 25, on which they are condensed.

On the other hand, $^{235}U^0$ and $^{238}U^0$ which are neutral particles are not affected by the electromagnetic field, so they will travel straight from the plasma generator 29 and impinge on either of the electrode surfaces that are on the line of sight from the plasma generator and on which they are condensed.

Figure 2:
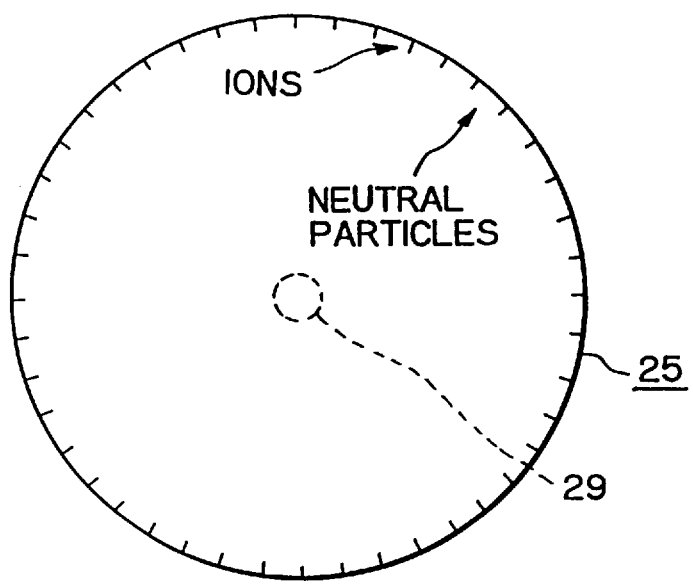
FIG. 2 is a cross section taken on the line A—A' of FIG. 1 showing details of the surface.
Figure 2A:
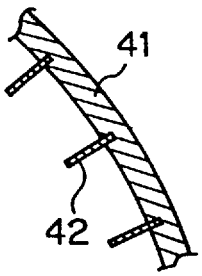
FIG. 2A show part of the pincushion electrode used in the embodiment of FIG. 2.

An electrode structure of the type shown in FIG. 2 and FIG. 2A may be used as means for distinguishing between the ions that rotate about the Z axis such as to reach the electrode with an increasing vibrational amplitude and the neutral particles that travel straight from the plasma generator toward the electrode without being separated isotopically. FIG. 2 is a cross section taken on the line A—A' of FIG. 1 and shows details of the surface and 2A illustrates part of the pincushion electrode 25 which also serves as a particle collecting plate. As shown in FIG. 2A, the principal electrode 41 in a pincushion form has a number of fins (fin-shaped plates) 42 detachably embedded on the side facing the isotope separating space in positions that are parallel to the Z axis. This electrode design ensures that the neutral particles travelling straight from the plasma generator 29 are deposited on different locations than the ions rotating about the Z axis.

The same surface structure may be adopted by the electrode 26a in the form of an inverted pileus and the electrode 26b in the form of a non-inverted pileus and this again allows the ions to be deposited on different locations than the neutral particles.

The substances such as the isotopes of uranium that have been deposited on electrodes 25, 26a and 26b in a separated or enriched form may be recovered by the following procedure; the electrodes are taken out of the vacuum vessel, with the fins 42 being optionally detached from the principal electrode 41, and the separated substances are chemically dissolved or otherwise treated for recovery.

Figure 3:
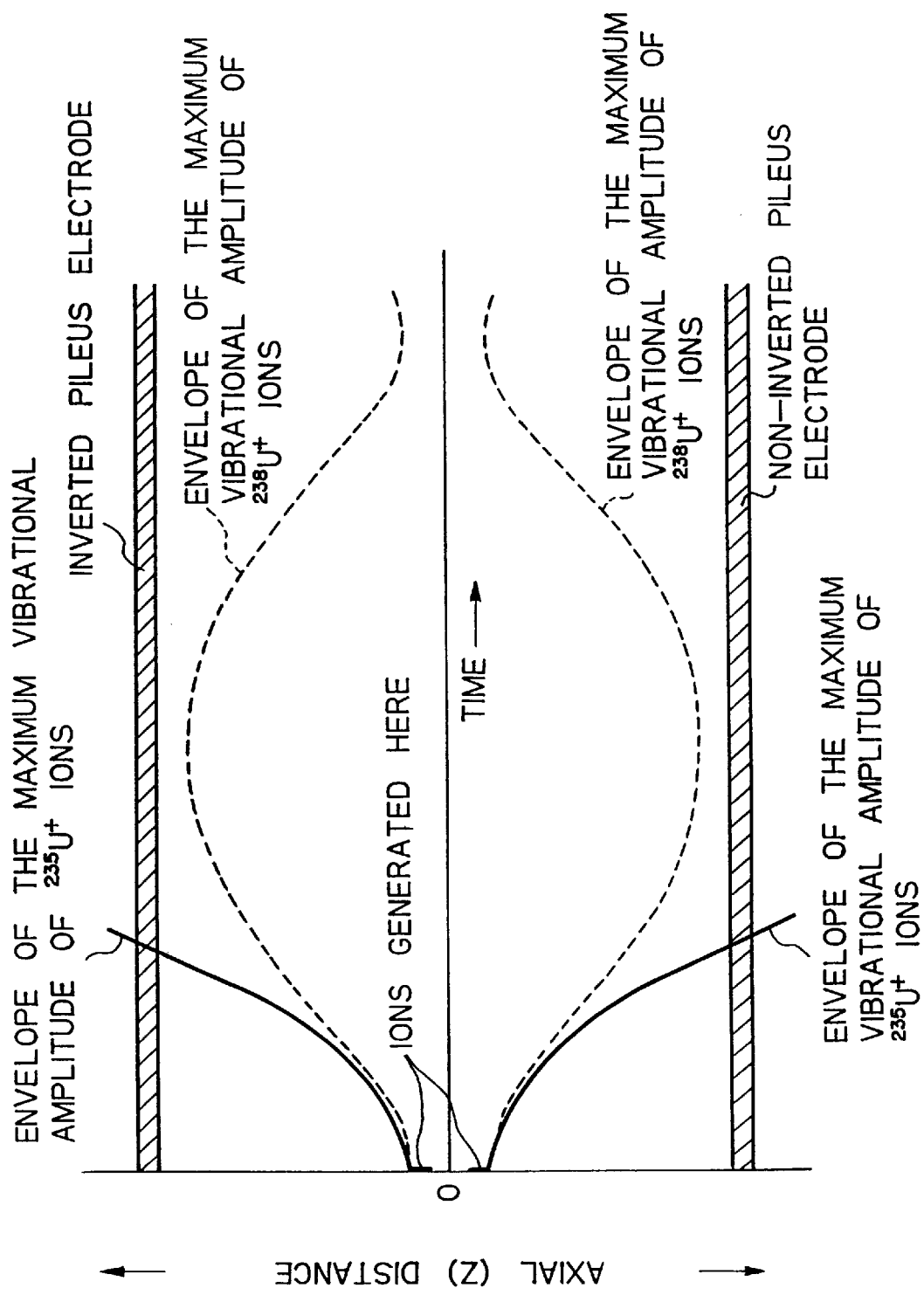
FIG. 3 is a graph showing the movement of ions relative to the positions of a pair of electrodes, one being in the form of an inverted pileus and the other in the form of a non-inverted pileus, in the embodiment.

FIGS. 3 and 4 illustrate the loci $^{235}U^+$ and $^{238}U^+$ emerging from the plasma generator 29 will respectively describe during their flight in the isotope separating space 31, with the critical mass $M_c$ being set at 237.

FIG. 3 shows schematically the loci of ions travelling in the axial (Z) direction and the solid lines indicate the time profile (or envelope) of the maximum amplitude of ion vibrations. As is clear from FIG. 3, the vibration of $^{238}U^+$ is confined within a certain space whereas the vibration of $^{235}U^+$ diverges with the amplitude progressively increasing with time until its ions reach the positions where the electrodes 26a and 26b are installed. In the case shown in FIG. 3, the electrodes 26a and 26b are located farther away from the maximum amplitude of the vibration of $^{238}U^+$, i.e., at least about 8 times as high as the ion-generating element in the plasma generator 29.

FIG. 4 shows schematically the loci of ions travelling in the radial (r) direction and the solid lines indicate the time profile (envelope) of the maximum amplitude of ion vibration. As is clear from FIG. 4, the vibration of $^{235}U^+$ is confined within a certain space whereas the vibration of $^{238}U^+$ diverges with the amplitude progressively increasing with time until its ions reach the positions where the pincushion electrode 25 is installed. In the case shown in FIG. 4, the electrode 25 is located in a radial position that exceeds the maximum amplitude of the vibration of $^{235}U^+$, i.e., at least about 11 times as great as the radius of the plasma generator 29.

EXAMPLE 2

Figure 5:
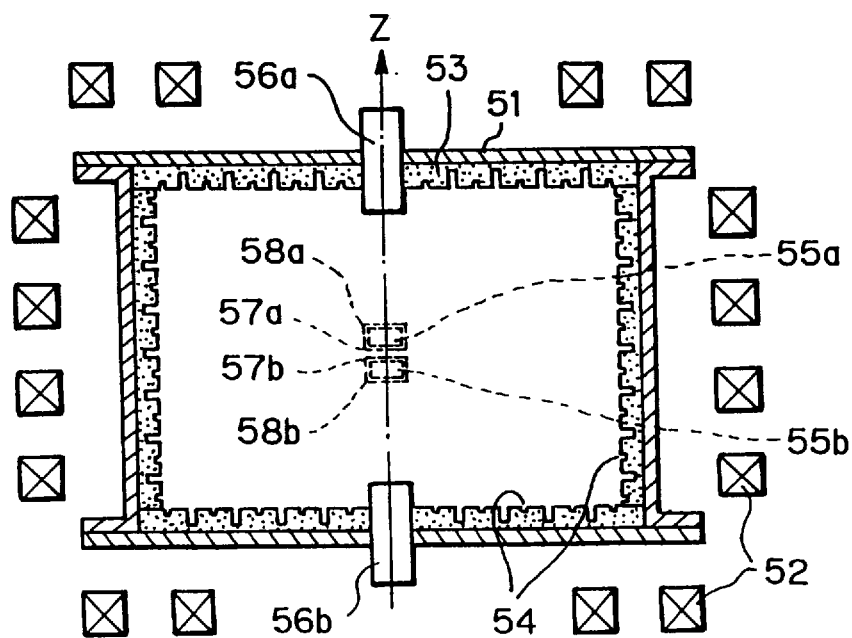
FIG. 5 is a longitudinal section of an isotope separator according to another embodiment of the invention.

FIG. 5 is a longitudinal section of an isotope separator according to another embodiment of the invention, in which the cylindrical vacuum vessel has a group of annular electrodes formed as an integral part for creating a specified electric field in the isotope separating space. The apparatus of this second embodiment features compactness.

The cylindrical vacuum vessel 51 is coupled to a pump-down apparatus which draws high vacuum via an exhaust port (not shown). The vessel 51 is surrounded by coils 52 that form a magnetic field in the axial direction of the cylinder which is the geometry assumed by the vessel 51. The inner surface of the vacuum vessel 51 is coated with an electric insulator 53 such as Teflon, which spaces apart annular electrodes 54 provided in the inner surface of the vessel 51. Each of the annular electrodes is supplied with a specified voltage.

The voltage to be applied to the annular electrodes is so set that it is equivalent to the application of specified values of a fixed voltage and a pulsating voltage to the pincushion electrode and a pair of electrodes, one being in the form of an inverted pileus and the other in the form of a non-inverted pileus (see Example 1), whereby an alternating electric field U expressed by the equation (1) and having small pulsations is created within the isotope separating space. Stated more specifically, each of the annular electrodes is supplied with a voltage that is equal to what would be sensed by those annular electrodes if the cylinder fitted with them were virtually immersed in the alternating electric field that is formed when specified values of a fixed voltage and a pulsating voltage are applied to the pincushion electrode and the pair of electrodes, one being in the form of an inverted pileus and the other in the form of a non-inverted pileus.

Two plasma generators 55a and 55b are provided along the Z axis in the center of the vacuum vessel 51, and an atomic (molecular) beam source 56a (or 56b) capable of supplying the atom of the substance to be separated (or the molecular containing said substance) is provided above the plasma generator 55a (or below the plasma generator 55b). The plasma generator 55a (or 55b) is composed of an annular tungsten filament 57a (or 57b) and an equipotential electrode 58a (or 58b). The hot electrons radiated from the filament 57a (or 57b) act effectively on the atoms (or molecules) supplied from the atomic (molecular) beam sources in the magnetic field (to cause PIG discharge), thereby enabling more ions to be generated.

Thus, the present invention provides a method and an apparatus for isotope separation that achieve high separation factor per stage (process), that enables the process throughput to be increased with ease and which yet is applicable to the isotopic separation of many elements.

What is claimed is:

1. An apparatus for isotope separation that comprises a vacuum vessel, a plasma generator located substantially in the center of said vacuum vessel, an electrode bounded by a hyperboloid of one sheet, a pair of electrodes bounded by a hyperboloid of two sheets, said electrodes being located within said vacuum vessel in such a way as to surround said plasma generator, a means for supplying said electrodes with a fixed voltage and a pulsating voltage to generate an alternating electric field, and magnetic field generating means located outside said vacuum vessel for generating a magnetic field parallel to the z-axis superimposed upon the electric field.

* * * * *